United States Patent [19]
Fujita et al.

[11] Patent Number: 5,293,321
[45] Date of Patent: Mar. 8, 1994

[54] CURVE EXTRACTING APPARATUS AND NC PROGRAMMING SYSTEM FOR FORMING NC PROGRAM BASED ON CURVES EXTRACTED BY THE APPARATUS

[75] Inventors: Satoru Fujita; Mitsuaki Oshita; Yuka Mitani, all of Hyogo, Japan

[73] Assignee: Mitsubishi Denki Kabushiki Kaisha, Tokyo, Japan

[21] Appl. No.: 731,828

[22] Filed: Jul. 11, 1991

[30] Foreign Application Priority Data

Jul. 13, 1990 [JP] Japan .................. 2-185562

[51] Int. Cl.⁵ .................. G06F 15/46; G06F 15/40
[52] U.S. Cl. .................. 364/474.26; 364/474.24; 364/474.29; 364/191
[58] Field of Search ............. 364/474.24, 191, 474.29, 364/474.26

[56] References Cited

U.S. PATENT DOCUMENTS

| | | | |
|---|---|---|---|
| 4,530,046 | 7/1985 | Munekata et al. | 364/474.24 |
| 4,556,957 | 12/1985 | Ichikawa | 364/474.25 |
| 4,868,761 | 9/1989 | Hayashi | 364/474.24 |
| 4,918,627 | 4/1990 | Garcia et al. | 364/474.24 |
| 5,067,087 | 11/1991 | Seki et al. | 364/474.24 |
| 5,095,439 | 3/1992 | Seki et al. | 364/474.24 |

OTHER PUBLICATIONS

Prof Dr. Kochan et al., CAD/NC-Kopplungen, ZwF 85 (1990) 3, pp. 155-159.

Primary Examiner—Jerry Smith
Assistant Examiner—Paul Gordon
Attorney, Agent, or Firm—Sughrue, Mion, Zinn, Macpeak & Seas

[57] ABSTRACT

A curve extracting apparatus for extracting curves such as closed loops, open loops and hole groups from drawing data prepared with a CAD system, and an NC programming system for forming NC programs by directly utilizing curves which are extracted by the curve extracting apparatus. With such apparatus and system, it is unnecessary to perform complicated operations such as a drawing data reading operation, a coordinate calculating operation and a numerical data inputting operation and the occurrence of errors can be eliminated, and the drawing data prepared with a CAD system can be directly utilized to form an NC program.

24 Claims, 14 Drawing Sheets

FIG. 3

| FIGU | ELEMENT | X | Y | R | I | J |
|---|---|---|---|---|---|---|
| 1 | STRAIGHT LINE | 190.0 | 50.0 | | | |
| 2 | STRAIGHT LINE | 150.0 | 50.0 | | | |
| 3 | CW ARC | 145.0 | 55.0 | 5.0 | 150.0 | 55.0 |
| 4 | STRAIGHT LINE | 145.0 | 140.0 | | | |
| 5 | CW ARC | 150.0 | 145.0 | 5.0 | 150.0 | 140.0 |
| 6 | STRAIGHT LINE | 185.0 | 145.0 | | | |
| 7 | CW ARC | 190.0 | 140.0 | 5.0 | 185.0 | 140.0 |
| 8 | STRAIGHT LINE | 190.0 | 120.0 | | | |
| 9 | CW ARC | 185.0 | 115.0 | 5.0 | 185.0 | 120.0 |
| 10 | STRAIGHT LINE | 180.0 | 115.0 | | | |
| 11 | CW ARC | 175.0 | 110.0 | 5.0 | 180.0 | 110.0 |
| 12 | STRAIGHT LINE | 175.0 | 90.0 | | | |
| 13 | CW ARC | 180.0 | 85.0 | 5.0 | 180.0 | 90.0 |
| 14 | STRAIGHT LINE | 190.0 | 85.0 | | | |
| 15 | CW ARC | 195.0 | 80.0 | 5.0 | 190.0 | 80.0 |
| 16 | STRAIGHT LINE | 195.0 | 55.0 | | | |
| 17 | CW ARC | 190.0 | 50.0 | 5.0 | 190.0 | 55.0 |

CURVE EXTRACTING APPARATUS AND NC PROGRAMMING SYSTEM FOR FORMING NC PROGRAM BASED ON CURVES EXTRACTED BY THE APPARATUS

BACKGROUND OF THE INVENTION

This invention relates to curve extracting apparatus, and an NC programming system, and more particularly to a curve extracting apparatus for extracting curves such as closed loops, open loops and hole groups from drawing data prepared with a CAD system or the like, and an NC programming system for forming NC programs by directly utilizing drawing data prepared with a CAD system or the like.

FIG. 1 shows the arrangement of a conventional NC programming system.

First, a machine drawing SH is formed with a machine drawing forming CAD system 20. One example of the machine drawing is as shown in FIGS. 2(a)–2(c).

Next, the operator (or NC programmer) reads the machine drawing SH, and defines curves such as close loops, open loops and hole groups with a curve inputting unit 50 which are to be machined in an NC mode. The procedure of defining those curves is as follows:

(1) In a display processing section 510, a menu display section 521 displays a menu on a graphic display unit 130 to allow the operator to specify a command or command.

(2) The operator selects an icon in the menu by clicking the mouse 160, to specify a curve to be defined, for instance, "a closed loop".

(3) An interaction processing section 540 activates a closed loop defining section 541.

(4) A closed loop defining section 541 causes the graphical display unit 130 to display a menu as a guide necessary for inputting parameters necessary for defining a closed loop.

(5) The operator operates an operating panel 150 or the mouse 160, to input the parameters necessary for the closed loop. The parameters are inputted for each of the edges forming the closed loop. More specifically, the parameters thus inputted are the types of edges, and the X and Y coordinates of the edges. For instance, the parameters of the edges of a closed loop CL indicated by the broken line in FIGS. 2(a)–2(c) are as listed in FIG. 3.

(6) The interaction processing section 540 transmits the inputted parameters to the closed loop defining section 541.

(7) In the closed loop defining section 541, the parameters are utilized to define a closed loop, which is stored as internal curve data D3.

(8) A defined configuration displaying section 523 operates to display the closed loop thus defined on the graphic display unit 130.

(9) The operator determines it from the display whether or not the definition is correct. If the definition is not correct, then the operator corrects it.

In processes of defining an open loop, a hole group and a groove configuration, instead of the closed loop defining section 541 described above, an open loop defining section 542, a hole group defining section 543 and a groove configuration defining section 544 are activated, respectively. However, the processes are fundamentally the same as the above-described process of defining a closed loop.

Next, in an output processing section 170, a machining region configuration outputting section 171 converts the internal curve data D3 thus formed into machining region configuration data D4, which are applied to an NC automatic program forming CAM system 30.

Heretofore, the above-described curve inputting unit 50 is employed for defining curves such as closed loops, open loops and hole groups which are used for formation of NC programs. However, the operation is rather troublesome, and is liable to be erroneous.

That is, the operator reads a drawing SH as shown in FIGS. 2(a)–2(c), to find curves corresponding to a required machining region or regions, and determines edges forming the curves, and inputs the parameters of the edges thus determined. Thus, the operations carried out by the operators are considerably troublesome. The closed loop CL shown in FIG. 2(a) is simple; however, it is necessary to input a large number of pieces of data as is seen from FIG. 3.

In addition, the operator may make mistakes in reading data from the drawing SH or in inputting the necessary parameters.

SUMMARY OF THE INVENTION

In view of the foregoing, an object of the invention is to eliminate the above-described difficulties accompanying a conventional NC programming system in that the operation is troublesome and is liable to be erroneous. More specifically, an object of the invention is to provide a curve extracting apparatus which can extract a curve or curves corresponding to a required machining region directly from drawing data which are prepared by a CAD system or the like, and an NC programming system for using the curve or curves thus extracted to form NC programs.

The above, and other object of the present invention is met by the provision of a curve extracting apparatus comprising input processing means for inputting drawing data; display processing means for performing a graphic displaying operation such as a drawing displaying operation or a menu displaying operation in accordance with the drawing data; interaction processing means for processing interactions between the apparatus and an operator inputting commands or the like; and closed loop extracting means which prompts the operator to specify as an initial edge an edge on a drawing displayed graphically, traces edges connected successively to the initial edge, and when a branch point connected to at least two edges is reached, prompts the operator to specify one of the edges connected to the branch point, or selects one of the edges which forms a maximum or minimum angle with the preceding edge thereof, and traces the following edges, to extract, as a closed loop, the edges which are traced until the initial edge is reached again.

The invention further provides a curve extracting apparatus which, according to the invention, comprises: input processing means for inputting drawing data; display processing means for performing a graphic displaying operation such as a drawing displaying operation or a menu displaying operation in accordance with the drawing data; interaction processing means for processing interactions between the apparatus and an operator inputting commands or the like; and open loop extracting means which prompts the operator to specify, as an initial edge and a final edge, two edges on a drawing displayed graphically, traces edges connected successively to the initial edge, and when a branch point connected to at least two edges is reached, prompts the operator to specify one of the edges connected to the branch point, and traces the following edges, to extract, as an open loop, the edges which are traced until the final edge is reached.

The invention further provides a curve extracting apparatus which, according to the invention, comprises: input processing means for inputting drawing data; display processing means for performing a graphic displaying operation such as a drawing displaying operation or a menu displaying operation in accordance with the drawing data; interaction processing means for processing interactions between the apparatus and an operator inputting commands or the like; and hole group extracting means which prompts the operator to specify as an initial hole a hole on a drawing displayed graphically, and retrieves holes which are equal in diameter to the initial hole, and extracts the initial hole and the holes thus retrieved as a hole group, or hole group extracting means which prompts the operator to specify as an initial hole a hole on a drawing displayed graphically and to specify a hole arrangement pattern, and retrieves holes which are equal in diameter to the initial hole, and are on the hole arrangement pattern, and extracts the initial hole and the holes thus retrieved as a hole group.

The apparatus having the above-described closed loop extracting means, according to the invention, further comprises: groove central axis configuration extracting means which prompts the operator to specify as an initial edge an edge on a closed loop extracted. The groove central axis configuration extracting means employs as a start point the middle point or the center of the initial edge, determines as a relay point the middle point of a straight line connected between the ends of two edges extended respectively from two ends of the initial edge, and performs an operation repeatedly such that the middle point of a straight line connected between the ends of two edges extended respectively from the ends of the preceding two edges is determined as a relay point, and which when a final edge is reached, determines as an end point the middle point or the center of the final edge, and connects the start point, relay points and end point with edges suitable for the closed loop, to form a groove central axis configuration.

The invention further provides an NC programming system which comprises: the above-described curve extracting apparatus; a CAD apparatus for forming drawing data to be applied to the curve extracting apparatus; and a CAM apparatus for forming NC programs in accordance with curve data prepared by the curve extracting apparatus.

In the curve extracting apparatus according to the invention, the input processing means reads drawing data prepared with a CAD system or the like, and the display processing means the drawing data thus read. The operator operates the interaction processing means to input commands or to specify concerned edges in the drawing displayed graphically. As a result, the closed loop extracting means, the open loop extracting means, the hole group extracting means, and the groove central axis configuration extracting means extracts a closed loop, an open loop, a hole group, and a groove central axis configuration, respectively. That is, with the curve extracting apparatus of the invention, the drawing data formed with a CAD system or the like can be utilized to directly extract curves necessary for a desired machining region.

This ability eliminates troublesome operations such as a drawing data reading operation, a coordinate calculating operation, and a numerical data inputting operation, thus contributing to a reduction of the occurrence of errors.

Furthermore, with the NC programming system according to the invention, drawing data formed with a CAD system or the like can be directly utilized to form NC programs.

BRIEF DESCRIPTION OF THE DRAWINGS

In the accompanying drawings:

FIG. 3 is a diagram showing examples of edge data;

DESCRIPTION OF THE PREFERRED EMBODIMENTS

One preferred embodiment of this invention will be described with reference to the accompanying drawings.

Figure 1:
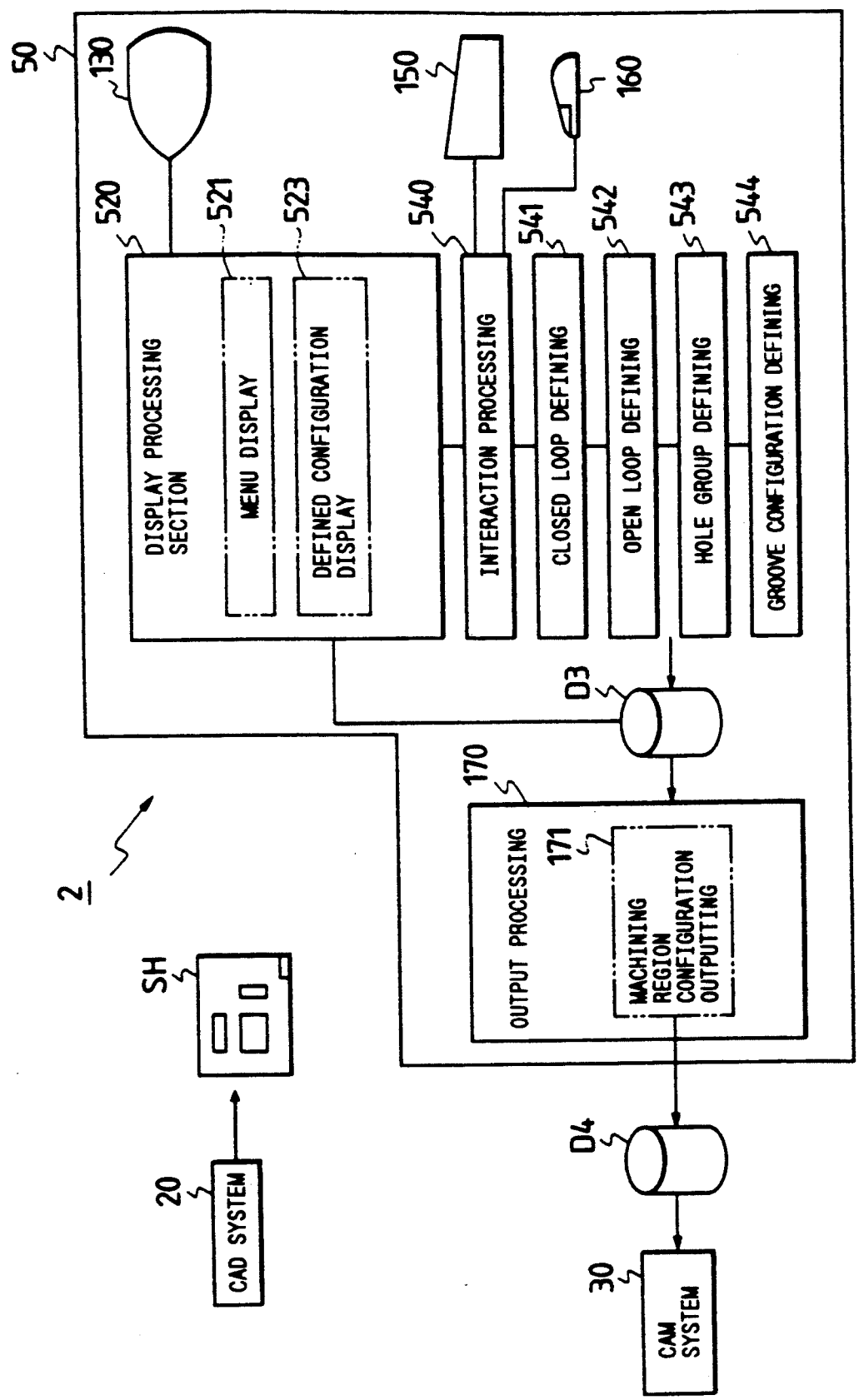
FIG. 1 is an explanatory diagram showing the arrangement of one example of a conventional NC programming system.
Figure 2:
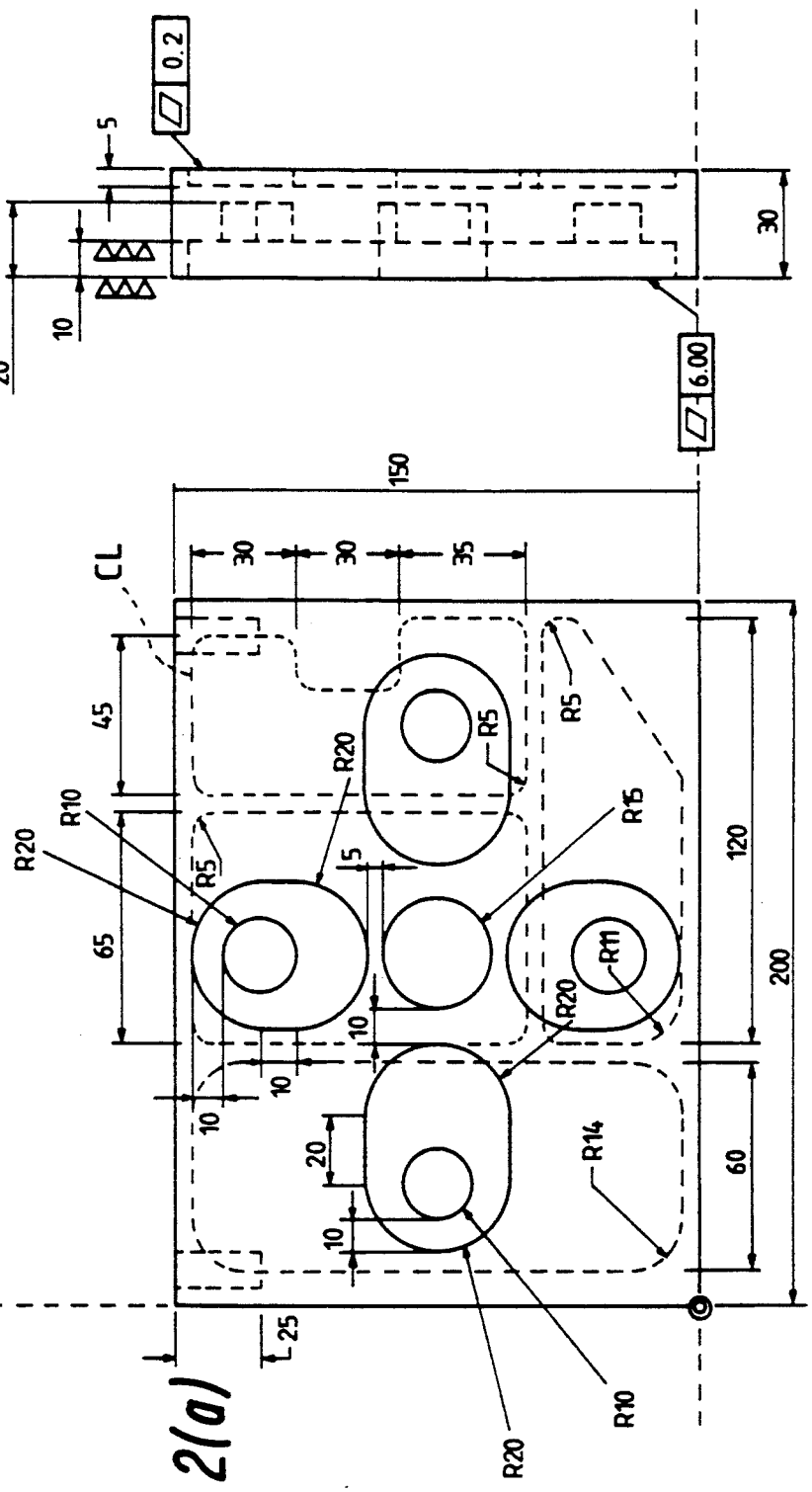
FIGS. 2(a)–2(b), and 2(c) is a diagram showing an example of a machine drawing.
Figure 4:
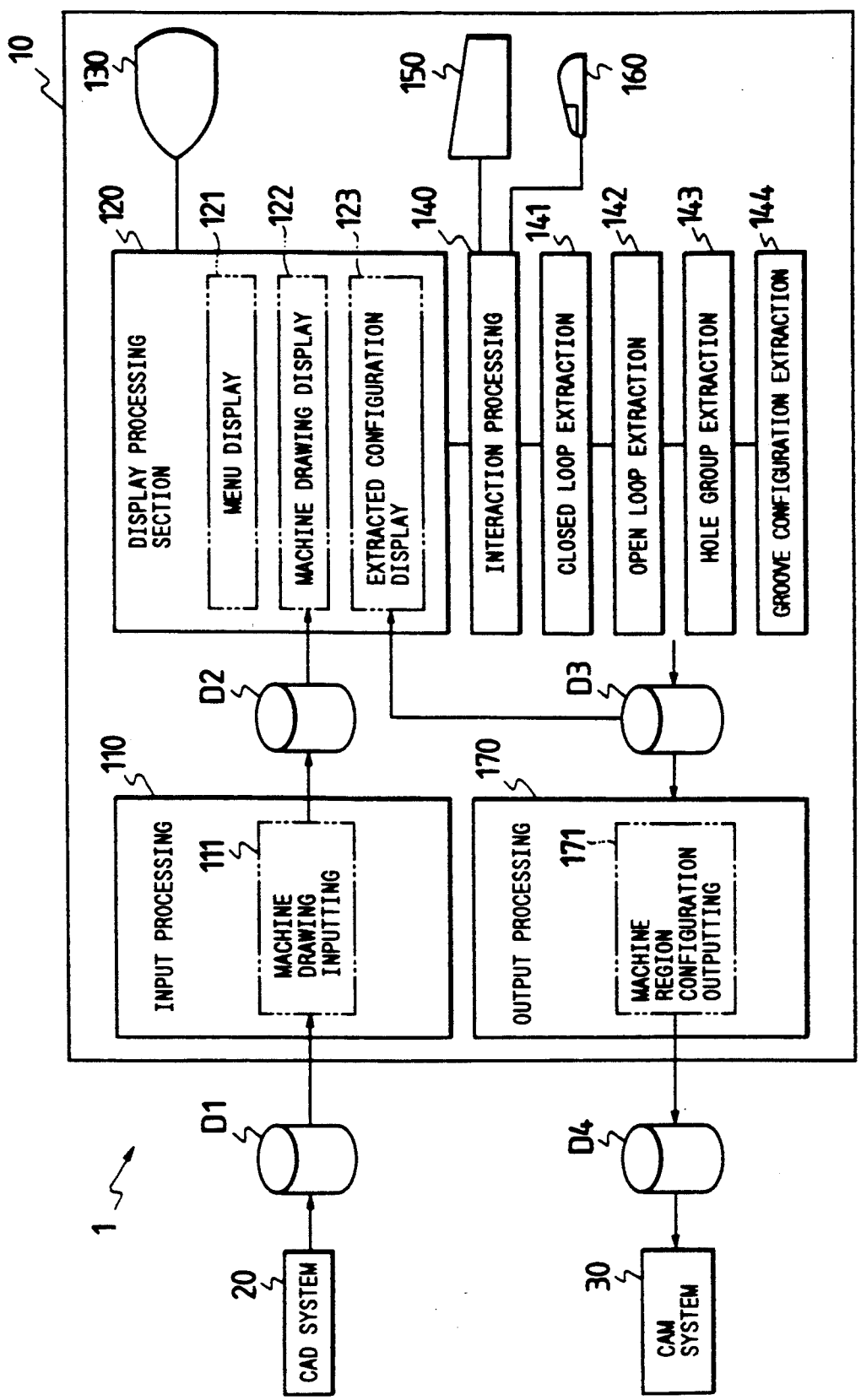
FIG. 4 is an explanatory diagram showing the arrangement of an NC programming system which constitutes one embodiment of this invention.

FIG. 4 is a block diagram showing the arrangement of an NC programming system including a curve extracting apparatus according to the invention.

A machine drawing forming CAD system 20 forms and outputs machine drawing data D1. The machine drawing data D1 are of wire frame information on a machine or machine component, and its most standardized type is IGES.

A curve inputting unit 10 reads the machine drawing data D1, extracts closed loops, open loops, hole groups and groove configurations to be machined in an NC mode, and outputs them as machining region configuration data D4. The curve inputting unit 10 will be described with reference to FIGS. 2(a) through 15 later in more detail.

An NC automatic program forming CAM system 30 operates to form an NC program by using the machining region configuration data D4.

In the NC program forming operation, closed loops are utilized for machining operations such as a face mill surface machining operation, an end mill surface machining operation, a pocket machining operation, and a pocket island machining operation; open loops are utilized for machining operations such as a line-axis machining operation, a line-right machining operation, a light-left machining operation, and a chamfering operation; hole groups are utilized for machining operations such as a drilling operation, a reaming operation, a back boring operation, and a blind hole machining operation; and groove configurations are utilized for machining operations such as for instance an end mill groove machining operation.

Figure 5:
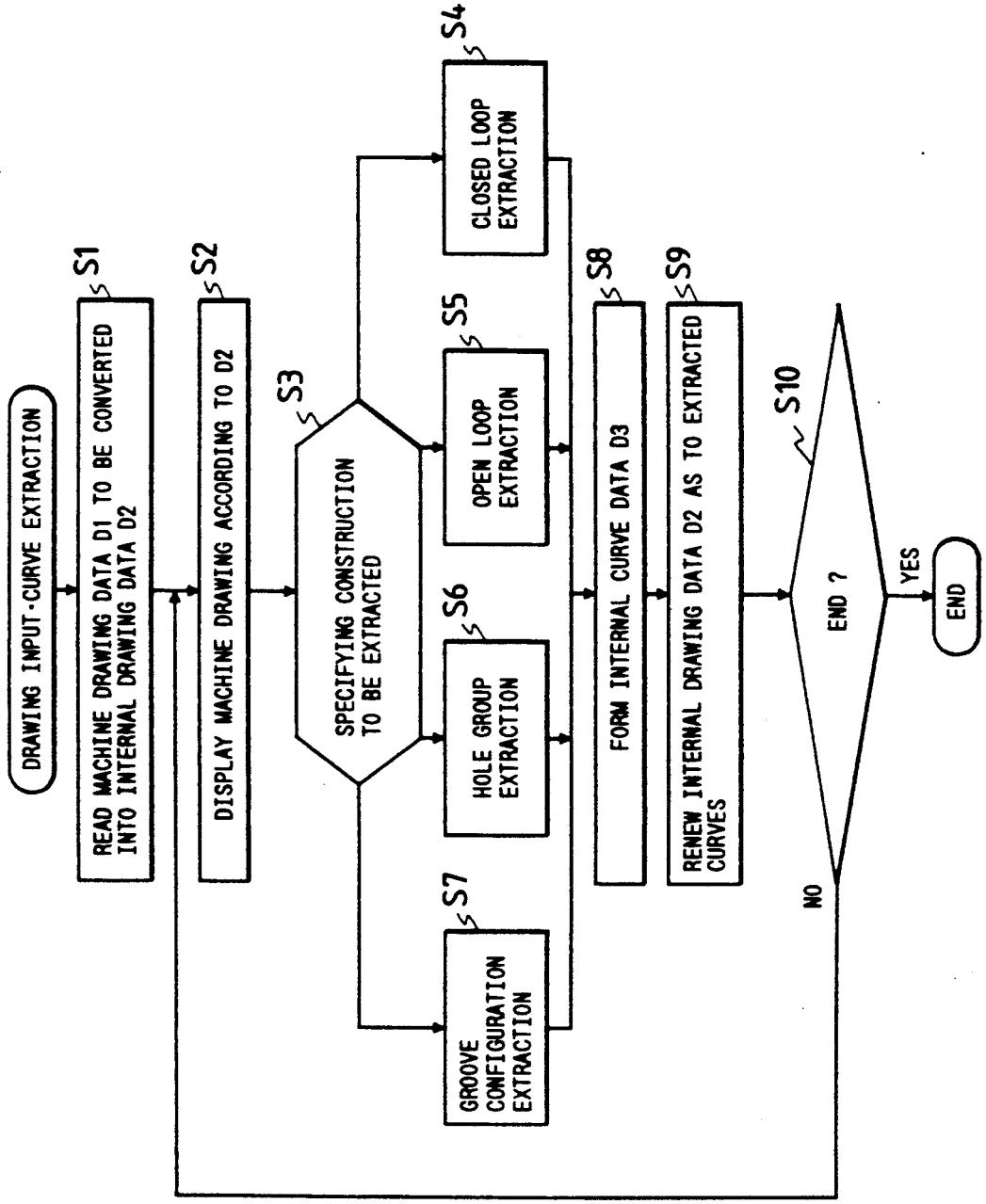
FIG. 5 is a flow chart for a description of a curve extracting operation.

FIG. 5 is a flow chart for a description of an operation of inputting machine drawing data D1 into the curve inputting unit 10, and a curve extracting operation.

Step S1: In an input processing section 110, its machine drawing inputting section reads the machine drawing data D1 and converts them into internal drawing data D2 which are internally accessible.

Step S2: In a display processing section 120, its machine drawing display section 122 displays a machine drawing on a graphic display unit 130 in accordance with the internal drawing data D2. In this operation, the edges are displayed "yellow", and dimensions and tolerances are displayed "blue". In addition, during a curve extraction, edges to be specified by the operator are displayed with "green dotted lines", and edges determined as part of curves are displayed with "green solid lines". After the completion of the curve extraction, the edges of the curve extracted are displayed "reddish purple".

Step S3: In the display processing section 120, its menu display section 121 displays a menu on the graphic display unit 130. The operator specifies the kind of configuration of a curve to be extracted by selecting an icon in the menu with the mouse 160. In response to the kind of configuration thus specified, an interaction processing section 140 activates a closed loop extracting section 141, an open loop extracting section 142, a hole group extracting section 143, or a groove configuration extracting section 144.

Steps S4, S5, S6 and S7: In these Steps S4, S5, S6 and S7, the close loop extracting section 141, the open loop extracting section 142, the hole group extracting section 143, and the groove configuration extracting section 144 are operated, respectively, as described later with reference to FIGS. 3 through 13.

Step S8: The curves extracted are accumulated, to form the aforementioned internal curve data D3. In accordance with the internal curve data D3, an extracted configuration displaying section 123 displays the extracted curves on the graphic display unit 130.

Step S9: With respect to the parts extracted as curves, the machine drawing displaying section 122 renews the internal drawing data D2, and displays the edges of the extracted curves "reddish purple".

Step S10: It is determined whether or not the operator has made an instruction to end the extracting operation. When it is determined that the instruction has been made, then the extracting operation is ended. If not, Step S2 is effected again.

Now, the closed loop extracting operation will be described in detail.

The closed loop extracting operation includes two modes; a first mode in which the operator specifies an initial edge, and a second mode in which an edge at a predetermined position is automatically specified as an initial edge. The operation further includes three modes; a third mode in which the operator specifies an edge at a branch point, a fourth mode in which at a branch point, an edge forming a minimum angle is automatically selected, and a fifth mode in which, at a branch point, an edge forming a maximum angle is automatically selected. Hence, the combination of those modes provides six different modes. The selective use of the modes according to the degree of complication of a machine drawing can extract closed loops with high efficiency.

Figure 6:
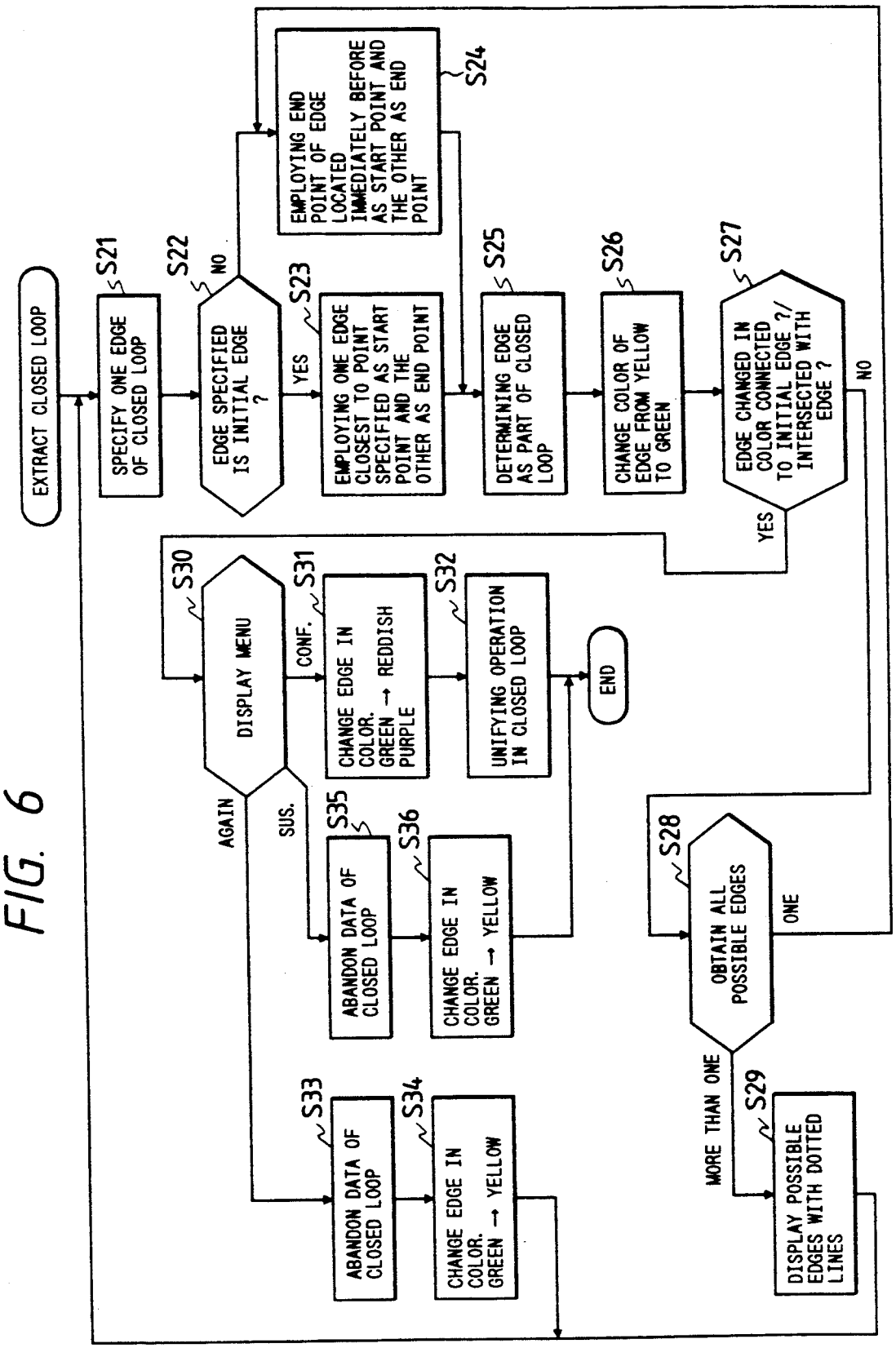
FIG. 6 is a flow chart for a description of a close loop extracting operation.

FIG. 6 is a flow chart for a detailed description of the closed loop extracting operation with the first mode in which the operator specifies an initial edge combined with the third mode in which the operator specifies an edge at a branch point. This operation will be described with reference to FIGS. 7(a) to 7(i) showing a concrete example of a closed loop.

Figure 7A:
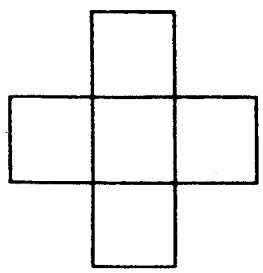
FIGS. 7(a), 7(b), 7(c), 7(e), 7(f), 7(g), 7(h), and 7(i) are diagrams for a description of a first concrete example of the closed loop extracting operation.
Figure 7D:
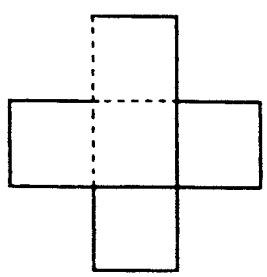

Step S21: The operator operates the mouse 160 to specify one edge of the closed loop among the edges shown on machine drawing is provided as shown in FIG. 7(a), the operator specifies one edge as shown in FIG. 7(b).

Step S22: It is determined whether or not the edge thus specified is an initial edge. When it is the initial edge, then Step S23 is effected; and when it is not, Step S24 is effected. For instance in the case of FIG. 7(b), the specified edge is the initial edge, and therefore Step S23 is effected.

Step S23: Of the intersections of the initial edge and other edges, the one closest to the specified point is employed as "a start point", and the other is employed as "an end point". For instance in the case of FIG. 7(c), the intersection on the left side of the initial edge is the start point (•), and the intersection on the right side of the initial edge is the end point (○).

Step S25: The edge with the start point and the end point is determined as part of the close loop.

Step S26: The color of the edge thus determined is changed from "yellow" to "green".

Step S27: It is determined whether the edge thus changed in color is connected to the initial edge or whether it is intersected with the initial edge. When it is connected to or intersected with the initial edge, Step S30 is effected; whereas when it is not, Step S28 is effected. For instance in the case of FIG. 7(c), it is not connected to nor intersected with the initial edge, Step S28 is effected.

Step S28: All the possible edges to which the end point of the current edge is connected are detected. When the number of possible edges is one, then Step S24 is effected; and when it is more than one, then Step S29 is effected. For instance in the case of FIG. 7(c), the number of possible edges is three, and therefore Step S29 is effected.

Step S29: The possible edges are displayed with "green dotted lines", and Step S21 is effected again. For instance as shown in FIG. 7(d), the three possible edges are displayed with "green dotted lines", and Step S21 is effected.

Step S21: The operator uses the mouse 160 to specify one of the possible edges thus displayed with "green dotted lines" which is included in the closed loop. For instance in the case where, as shown in FIG. 7(d), three possible edges are indicated, one of the edges is specified as shown in FIG. 7(e).

Step S22: For instance in the case of FIG. 7(e), it is determined that the edge is not the initial edge, and Step S24 is effected.

Step S24: Of the intersection of the edge thus specified and other edges, the end point of the edge located immediately before it is employed as a start point, and the other is employed as an end point.

Figure 7G:
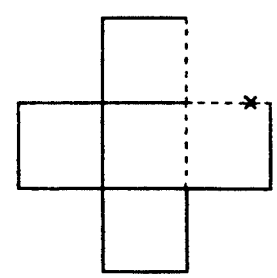
Figure 7B:
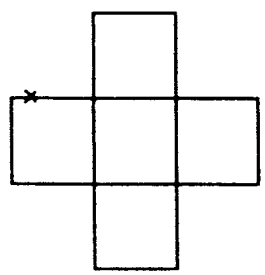
Figure 7E:
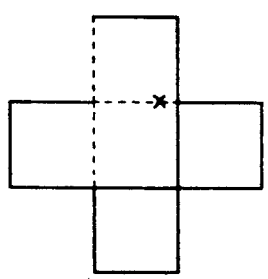
Figure 7H:
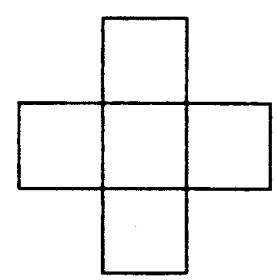
Figure 7C:
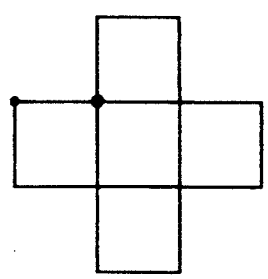
Figure 7F:
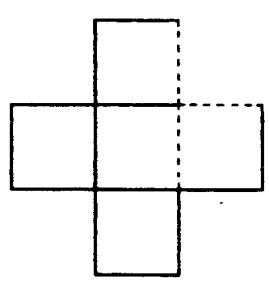

Steps S25 through S29 are effected again, and when the state shown in FIG. 7(f) is obtained, Step S21 is effected again.

When, in Step S21, one of the possible edges is specified as shown in FIG. 7(g), Step S22, S24, S25, S26, S27 and S28 are effected in the stated order.

Step S28: For instance in the case of FIG. 7(h), the number of possible edges is one, and therefore Step S24 is effected.

The above-described operations are repeatedly carried out until the initial edge is reached. And the operation is advanced from Step S27 to Step S30.

Step S30: A pop-up menu "Confirm/Over-again/Suspend" is displayed, and the operator selects one of the items in the menu. When the operator selects "Confirm", then Step S31 is effected; when he selects "Over-again", then Step S33 is effected; and when he selects "Suspend", then Step S35 is effected.

Step S31: Since the extraction of the close loop has been accomplished, the color of the edges displayed "green" is changed to "reddish purple", and Step S32 is effected.

Step S32: In the case where the edges of the closed loop include ones such as those of one straight line which are equal in geometric characteristic and are continuous, a unifying operation is carried out. Thus, the closed loop extracting operation is ended.

Step S33: The data of the extracted closed loop are abandoned, and Step S34 is effected.

Step S34: The color of the edges displayed "green" is changed to "yellow", and Step S21 is effected again.

Step S35: The data of the extracted closed loop are abandoned, and Step S36 is effected.

Step S36: The color of the edges displayed "green" is changed to "yellow". Thus, the closed loop extracting operation is ended.

Figure 7I:
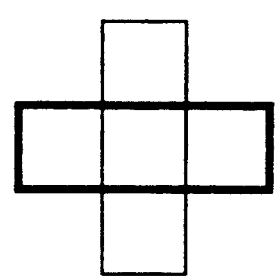

FIG. 7(i) shows the extracted closed loop with a double line.

FIGS. 8(a) to (g) shows a concrete example of a closed loop extracting operation with the first mode in which the operator specifies an initial edge combined with the fourth mode in which, at a branch point, an edge forming a minimum angle is automatically selected.

Figure 8A:
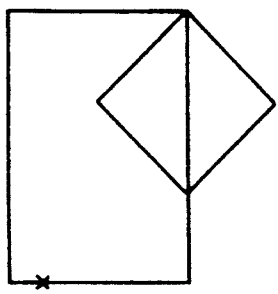
FIGS. 8(a), 8(b), 8(c), 8(d), 8(e), 8(f), and 8(g) are diagrams for a description of a second concrete example of the closed loop extracting operation.

In FIG. 8(a), the operator specifies an initial edge on the given machine drawing.

Figure 8D:
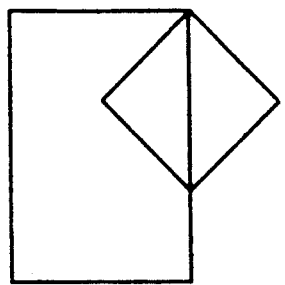
Figure 8G:
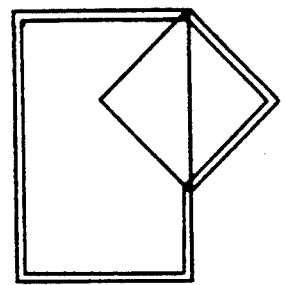
Figure 8B:
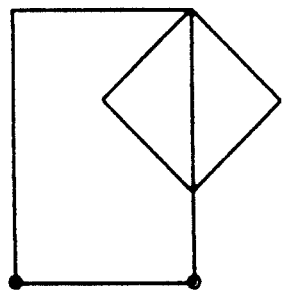

In FIG. 8(b), the start and end points of the initial edge are determined.

Figure 8E:
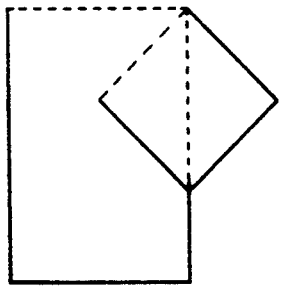
Figure 8C:
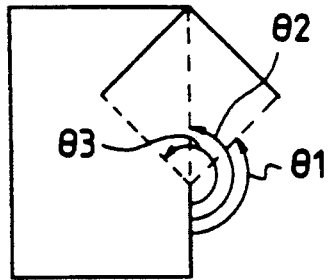

In FIG. 8(c), a branch point with three possible edges is reached. In this operation, in the polar coordinate system in which the branch point is the original point and the direction opposite to the direction of the edge is the reference direction, the angles $\theta_1$, $\theta_2$ and $\theta_3$ of the possible edges are detected, so that the possible edge having the minimum angle is selected.

In FIG. 8(d), the possible edge having the minimum angle $\theta_1$ is selected.

In FIG. 8(e), a branch point with three possible edges is reached. Similarly as in the case of FIG. 8(c), the possible edge having the minimum angle is selected.

Figure 8F:
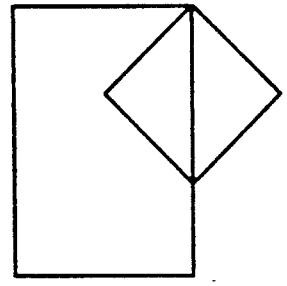

In FIG. 8(f), the possible edge having the minimum angle is selected.

In FIG. 8(g), the closed loop extracted is shown with a double line. The closed loop is the outermost loop.

Figure 9C:
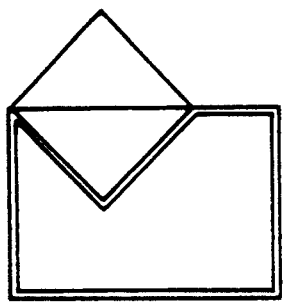
FIGS. 9(a), 9(b), and 9(c) are diagrams for a description of a third concrete example of the closed loop extracting operation.
Figure 9B:
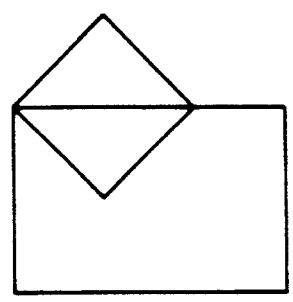
Figure 9A:
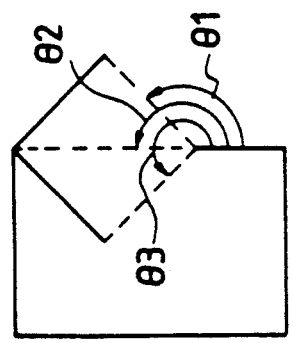

FIGS. 9(a) to 9(c) shows a concrete example of a closed loop extracting operation in the case where the first mode in which the operator specifies an initial edge is combined with the fifth mode in which, at a branch point, an edge forming a maximum angle is automatically selected.

In FIG. 9(a), a branch point having three possible edges is reached. In this operation, in the polar coordinate system in which the branch point is the original point and the direction opposite to the direction of the edge is the reference direction, the angles $\theta_1$, $\theta_2$ and $\theta_3$ of the possible edges are detected, so that the possible edge having the maximum angle is selected.

In FIG. 9(b), the possible edge having the maximum angle $\theta_3$ is selected.

FIG. 9(c) shows the closed loop thus extracted. The closed loop is the innermost loop.

Figure 10C:
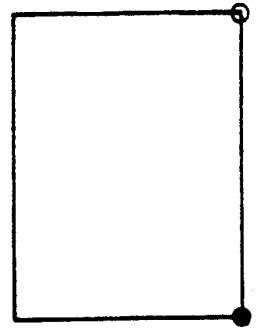
FIGS. 10(a) and 10(b), and 10(c) are diagrams for a description of an automatic initial edge selecting operation.
Figure 10B:
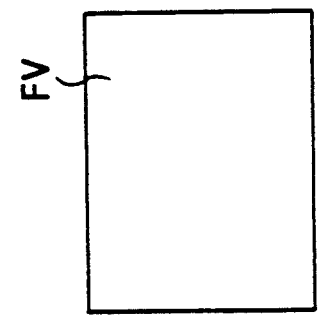
Figure 10A:
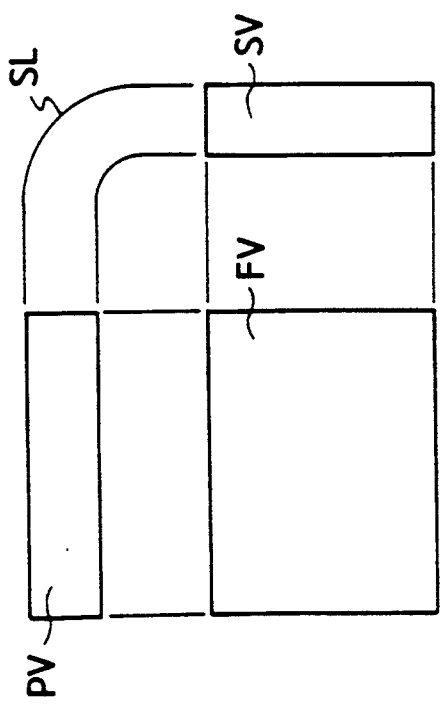

FIGS. 10(a) to 10(c) show a concrete example of a mode in which an edge at a predetermined position on the given machine drawing is automatically selected.

As shown in FIG. 10(a), a front view (FV), a plan view (PV) and a side view (SV) are provided on one drawing. These views are separated from one another with regions where no edges are provided, and the essential view is taken out as shown in FIG. 10(b). Thereafter, as shown in FIG. 10(c), the lowermost (or leftmost) edge is selected as an initial edge. Then, the left end (or the lower end) of the initial edge is employed as a start point, and the right end (or the upper end) of the initial edge is employed as an end point.

FIGS. 11(a) to 11(i) show a concrete example of an open loop extracting operation.

Figure 11A:
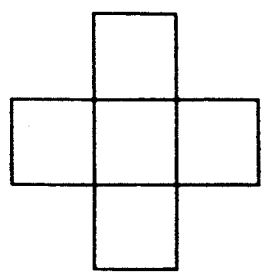
FIGS. 11(a), 11(b), 11(c), 11(d), 11(e), 11(f), 11(g), 11(h), and 11(i) are diagrams for a description of one concrete example of an open loop extracting operation.

FIG. 11(a) shows a machine drawing displayed.

Figure 11B:
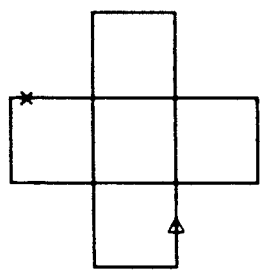

In FIG. 11(b), the operator specifies an initial edge (×) and a final edge (△).

Figure 11C:
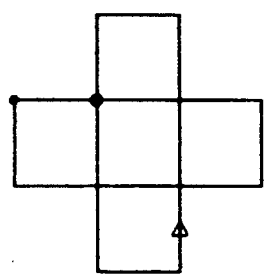

In FIG. 11(c), the start point (●) and the end point (○) of the initial edge are specified.

Figure 11D:
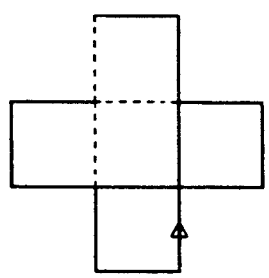

In FIG. 11(d), a branch point with three possible edges is reached, and the three possible edges are displayed with "green dotted lines".

Figure 11E:
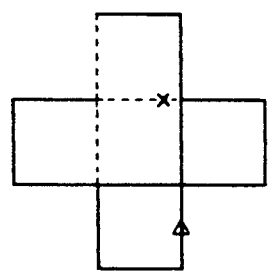

In FIG. 11(e), the operator specifies one of the three possible edges.

Figure 11F:
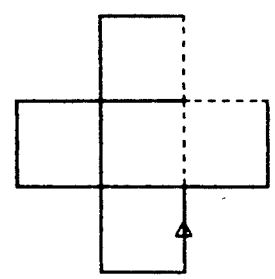

In FIG. 11(f), another branch point with three possible edges is reached, and the three possible edges are displayed with "green dotted lines".

Figure 11G:
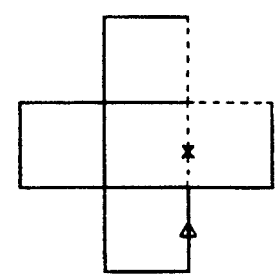

In FIG. 11(g), the operator specifies one of the three possible edges.

Figure 11H:
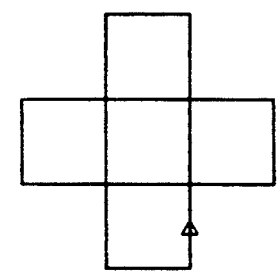

In FIG. 11(h), the final edge is reached.

Figure 11I:
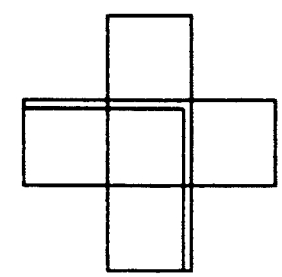

In FIG. 11(i), the open loop thus extracted is shown with a double line.

Figure 12:
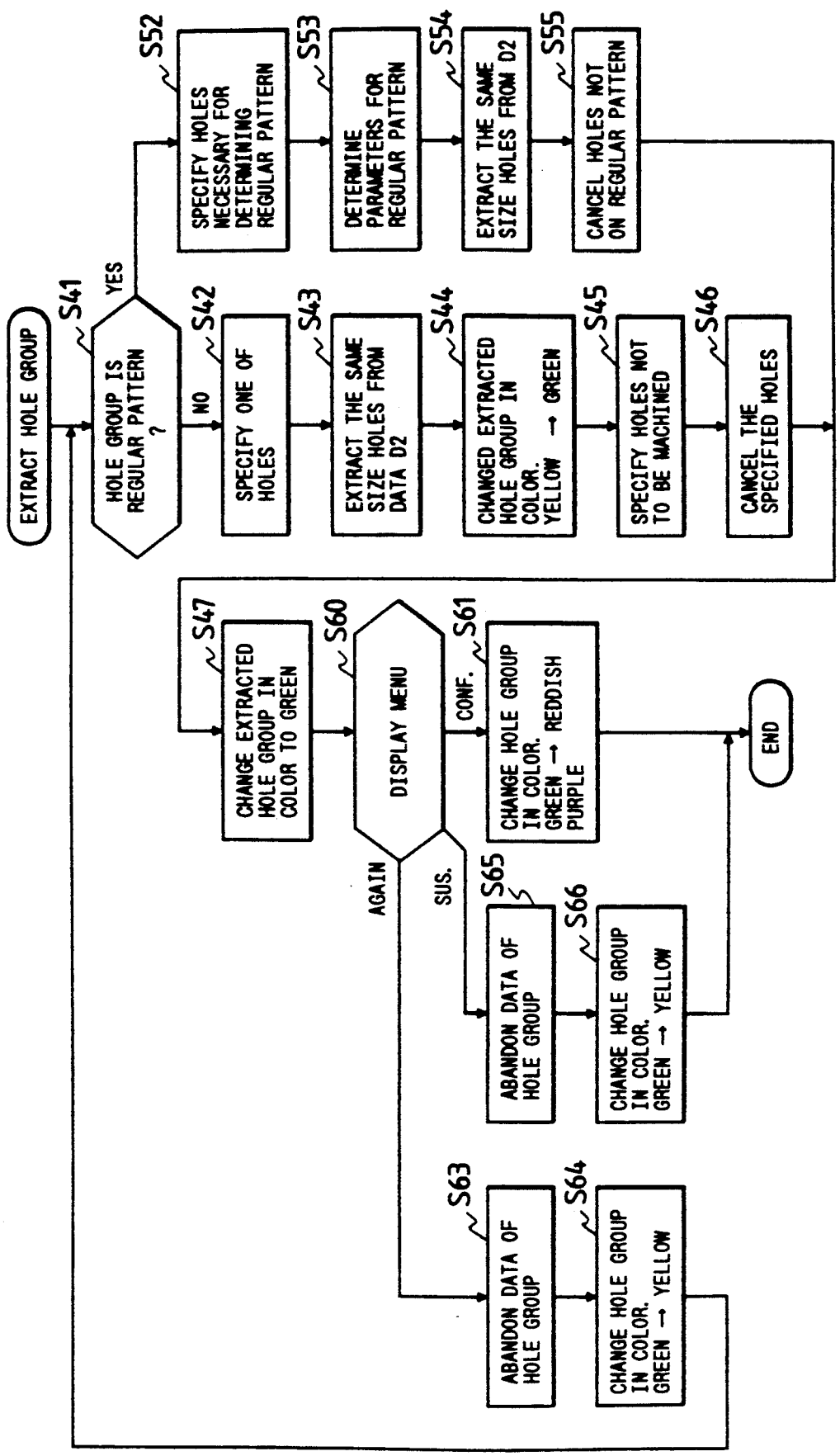
FIG. 12 is a flow chart for a description of a hole group extracting operation.

FIG. 12 is a flow chart for a detailed description of the hole group extracting operation.

Figure 13A:
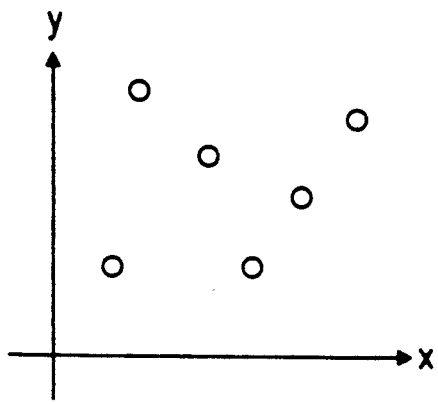
FIGS. 13(a), 13(b), 13(c), 13(d), and 13(e) are diagrams showing examples of a hole group.

Step S41: The operator utilizes a menu displayed, to specify that the hole group is of a regular pattern, or it is not. When the hole group is not of a regular pattern, Step S42 is effected. FIG. 13(a) shows a hole group which is not of a regular pattern. When the hole group is of a regular pattern, Steps S52 is effected. FIGS. 7(a) to 7(i) show hole groups of regular patterns.

The following Steps S42 through S46 are for the case where a hole group is not of a regular pattern:

Step S42: One of the holes forming the hole group is specified with the mouse 160.

Step S43: The radii of the holes are obtained from the internal drawing data D2, and all the holes which are equal in radius to the hole thus specified are extracted.

Step S44: The color of the hole group thus extracted is changed from "yellow" to "green".

Step S45: Of the holes displayed "green", those which are not to be machined are specified by the operator.

Step S46: The holes thus specified by the operator are canceled out of the extracted hole group. Holes in one and the same direction in a three-dimensional space can be machined with the machining posture maintained unchanged, and therefore it is effective to extract them as one hole group. Holes which are not in one and the same direction in a three-dimensional space cannot be machined with the machining posture maintained unchanged, and therefore it is not effective to extract them as one hole group even if they are equal in radius. However, such are holes that are included in the holes extracted in Step S43, and therefore they are excluded therefrom by the operator.

The following Steps S52 through S55 are for the case where the hole group is of a regular pattern.

Step S52: The operator uses the mouse 160 to specify as many holes as is necessary for determining a regular pattern for the hole group. For instance in FIG. 13(b), both and holes Cs and Ce in a line, and a hole Cp adjacent to one of the two end holes are specified.

Figure 13D:
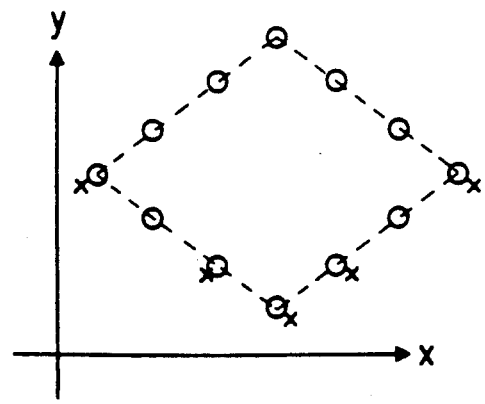
Figure 13B:
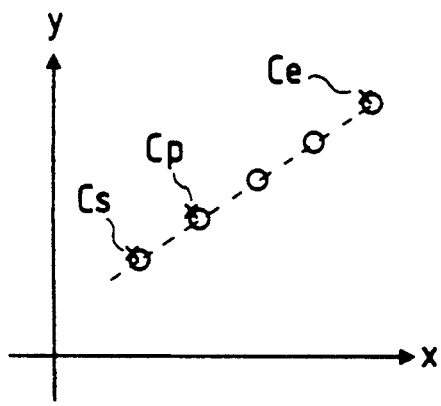
Figure 13E:
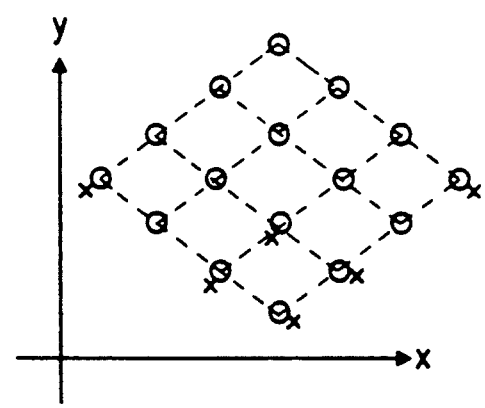
Figure 13C:
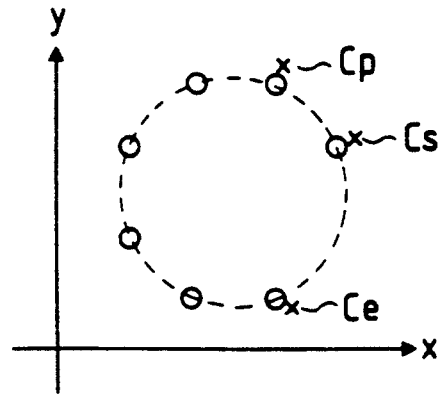

In the case of FIG. 13(c) (in which the hole group is of an arc/circle pattern), both end holes Cs and Ce of the arc, and a hole Cp adjacent to one of the end holes are specified.

In the case of FIG. 13(d) (in which the hole group is of a rectangle pattern), holes defining two adjacent sides of the rectangle are specified.

In the case of FIG. 13(d) (in which the hole group is of a grid pattern) holes defining a grid pitch and two sides of the grid are specified.

Step S53: In accordance with the regular pattern of the hole group, its parameters are determined.

For instance in the case of FIG. 13(b), $$\text{Line angle} = \tan^{-1}\{(Ye-Ys)/(Xe-Xs)\}$$

$$\text{Line length} = \{(Ye-Ys)^2 + (Xe-Xs)^2\}^{\frac{1}{2}}$$

$$\text{Pitch} = \text{the smaller of the } \{(Ys-Yp)^2 + (Xs-Xp)^2\}^{\frac{1}{2}}$$

and $$\{(Ye-Yp)^2 + (Xe-Xp)^2\}^{\frac{1}{2}}$$

where the coordinates of the center of the hole Cs is (Xs, Ys), the coordinates of the center of the hole Ce is (Xe, Ye), and the coordinates of the center of the hole Cp is (Xp, Yp).

In the case of FIG. 13(c) in which the hole group is of an arc/circle pattern, the three holes Cs, Ce and Cp are on one arc/circle. Therefore, the coordinates of the center of the arc/circle, and the radius of the latter are calculated as parameters. In addition, the angle of the straight line connecting the center of the arc/circle and the hole Cs, and the angle of the straight line connecting the center of the arc/circle and the hole Ce, and the pitch angles are calculated as parameters.

In the case of FIG. 13(d) in which the hole group is of a rectangle pattern, the parameter of the two adjacent sides of the rectangle are calculated. In addition, parameters of the remaining two sides are calculated since the two sides are connected to the firstly mentioned two sides and are in parallel to the latter.

In the case of FIG. 13(e) in which the hole group is of a grid pattern, the coordinates of the grid points (or holes) are calculated as parameters from the fact that the holes are arranged with a predetermined pitch.

Step S54: The radii of the holes are obtained from the internal drawing data D2, and all the holes which are equal in radius to the specified hole are extracted.

Step S55: Of the holes thus extracted, those the coordinates of the centers of which are not on the regular pattern are canceled out of the hole group.

Thus, the hole group has been extracted. Therefore, the following Step S47 is effected.

Step S47: The hole group thus extracted is displayed "green".

Step S60: The pop-up menu "Confirm/Over-again/-Suspend" is displayed. The operator selects one of the items in the menu. When the operator selects "Confirm", then Step S61 is effected; when he selects "Over-again", then Step S63 is effected; and when he selects "Suspend", then Step S65 is effected.

Step S61: Since the extraction of the hole group has been accomplished, the color of the hole group displayed "green" is changed to "reddish purple". Thus, the hole group extracting operation has been ended.

Step S63: The data of the extracted hole group are abandoned, and Step S64 is effected.

Step S64: The color of the hole group displayed "green" is changed to "yellow", and Step S41 is effected again.

Step S65: The data of the extracted hole group are abandoned, and Step S66 is effected.

Step S66: The color of the edges displayed "green" is changed to "yellow". Thus, the hole group extracting operation has been ended.

Figure 14:
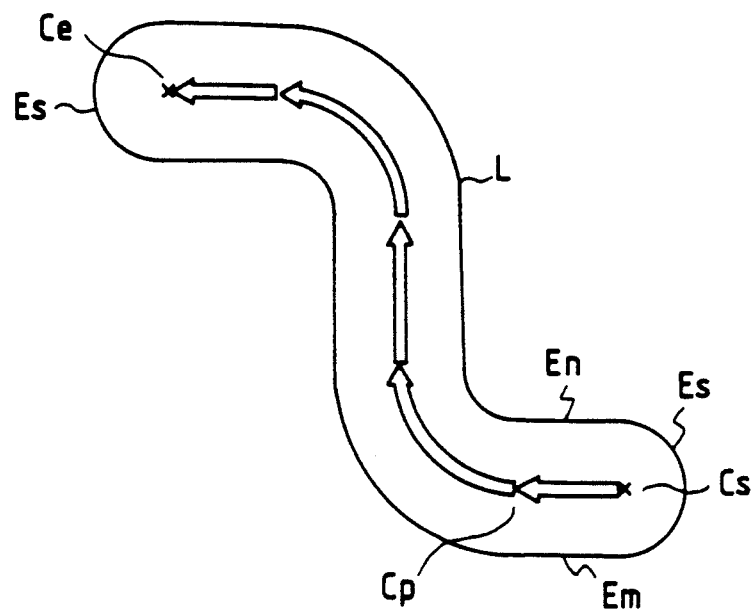
FIG. 14 is a diagram for a description of one concrete example of a groove configuration extracting operation.

FIG. 14 is a diagram for a description of a concrete example of the groove configuration extracting operation. The groove configuration is extracted as follows:

First Step: The contour line L of the groove is extracted by using the above-described closed loop extracting procedure.

Second Step: The operator specifies as an initial edge Es one of the edges of the contour line L.

Third Step: When the initial edge Es is a straight line, then the middle point is employed as the start point Cs of the groove central axis configuration; and when the initial edge Es is an arc, then the center of the arc is employed as the start point Cs.

Fourth Step: Two edges En and Em connected to both ends of the initial edge Es are picked up.

Fifth Step: A straight line is connected to the ends of the two edges En and Em thus picked up the remaining ends of which are connected to the initial edge Es, and the middle point of the straight line is employed as the first relay point Cp of the groove central axis configuration.

Sixth Step: If there are edges connected to the two edges, then the following seventh step is effected; and if not, the following tenth step is effected.

Seventh Step: Two edges connected to the firstly mentioned two edges are picked up.

Eighth Step: A straight line is connected to the ends of the two edges thus picked up the remaining ends of which are connected to the two edges Em and En, and the middle point of the straight line is employed as the next relay point of the groove central axis configuration.

Ninth Step: The sixth step is effected again.

Tenth Step: The middle point or center of the last edge Ee is employed as the end point Ce of the groove central axial configuration.

Eleventh Step: The edges connecting the start point Cs, the relay points, and the end point Ce are determined so as to be in conformation with the configuration of the contour line L. Thus, the groove configuration extracting operation is ended.

When the initial edge Es or the final edge Ee is an arc, then the groove central axial configuration is a normal one. When, on the other hand, the initial edge Es or the final edge Ee is a straight line, then the groove central axial configuration has an open end. At the open end, the tool comes outside as much as 0.5 R.

Figure 15:
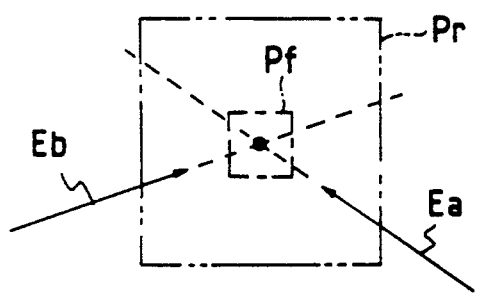
FIGS. 15 and 16 are diagrams outlining the precision in the arithmetic operation of intersections.
Figure 16:
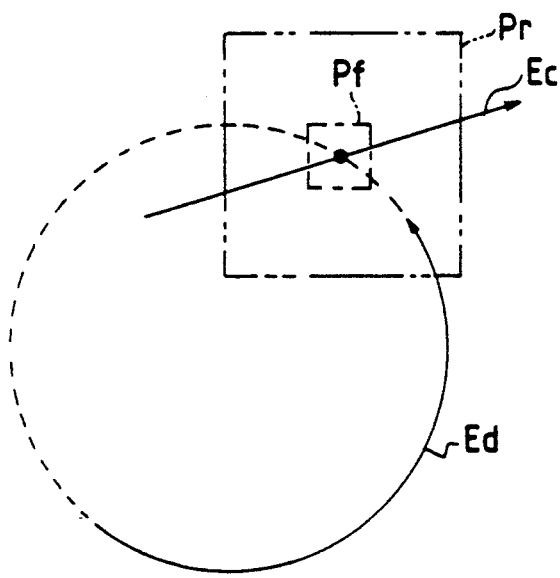

In the above-described curve extracting operation, the conditions of connection of the edges are determined, the intersections of the edges are detected, and the identification of the edges is performed. In this connection, arithmetic operations are carried out for precision as follows:

For instance in the case of FIG. 15, it is determined that, with $0.5\mu$ precision (Pr), the edges Ea and Eb have no intersection, and that, with a $2.0\mu$ precision (Pf), the two edges have an intersection. Similarly, in the case of FIG. 16, it is determined that, with a $0.5\mu$ precision (Pf), the edges Ec and Ed have no intersection, and that, with a $2.0\mu$ precision (Pr), the edges have an intersection.

Machine drawing data prepared on CAD may be of single precision, or of double precision. In addition, machine drawings are not constant in precision. However, the arithmetic operations carried out for precision in the above-described manner can deal with any machine drawing smoothly with no trouble.

Figure 17:
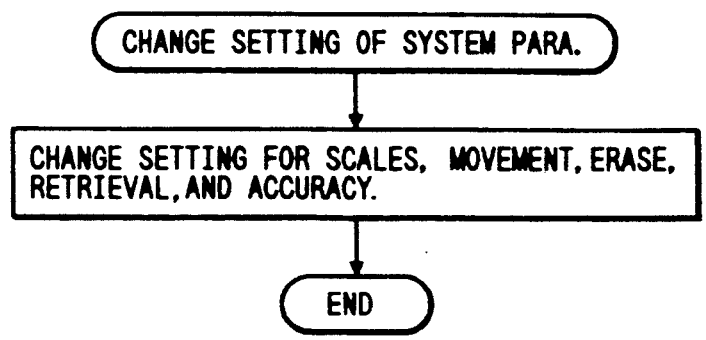
FIG. 17 is a flow chart for a description of a system parameter setting and changing operation.

FIG. 17 is a flow chart for setting system parameters with the curve inputting unit 10.

During interaction for a curve extracting operation, the system parameters can be freely set and changed such as machine drawing displaying scales, movement of edges, erase and retrieval of dimensional lines, and operating precision.

When a machine drawing is displayed as it is, then sometimes it is hard to read being intricate. However, if the drawing is displayed with the aforementioned parameters changed or with the elements in the drawing changed in color, then it turns out to be readable, and the curve extracting operation can be performed with high efficiency and with high accuracy.

Figure 18:
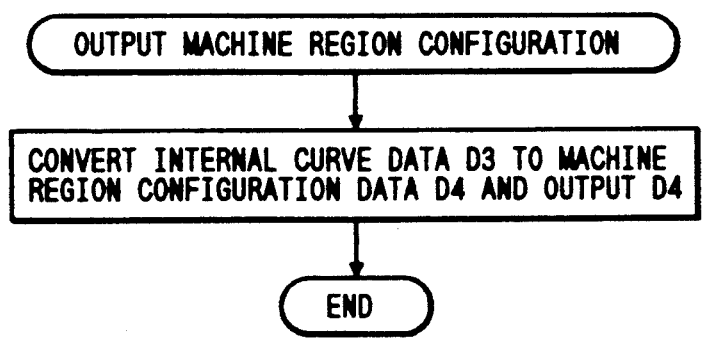
FIG. 18 is also a flow chart for a description of a machining region configuration outputting operation.

FIG. 18 is a flow chart for a description of an operation of outputting the machining region configuration data D4 from the curve inputting unit 10.

In the output processing section 170, the machining region configuration outputting section 171 converts the internal curve data D3 into machining configuration data D4, which are applied the NC automatic program forming CAM system 30.

As is apparent from the above description, in the NC programming system 1, the machine drawing data D1 prepared by the machine drawing forming CAD system 20 are directly utilized, to form machining region configuration data D4 for the NC automatic program forming CAM system 30, and to form an NC program. That is, with the NC programming system, NC programs can be formed with high efficiency and with high accuracy.

The above-described curve inputting unit 10 comprises four curve extracting sections, namely, the closed-loop extracting section 141, the open loop extracting section 142, the hole group extracting section 143, and the groove configuration extracting section 144; however, it may additionally have a section for extracting, for instance, the sectional curves of metal molds. In general, curves which can be expressed with wire frames can be extracted similarly as in the above-described closed loop extracting operation, open-loop extracting operation, hole group extracting operation, and groove configuration extracting operation.

In the above-described curve inputting unit 10, the edges are displayed by using different colors such as yellow, blue, green and reddish purple, and by using solid lines and broken lines. In order to obtain the same effects in the case of a monochromatic display, the edges may be displayed by using different luminances and different segment characteristics.

In the above-described embodiment, the curve inputting unit 10 is utilized for formation of NC programs; however, it may be equally utilized for inputting curve data, for instance, into a solid modeler.

EFFECTS OF THE INVENTION

With the curve extracting apparatus according to the invention, the curves in a drawing formed with a CAD system can be extracted to form curve data.

Accordingly, in formation of an NC program, it is unnecessary to perform complicated operations such as a drawing data reading operation, a coordinate calculating operation, and a numerical data inputting operation, and the occurrence of errors can be suppressed as much.

With the NC programming system of the invention, drawing data prepared with a CAD system or the like can be directly utilized to form an NC program.

What is claimed is:

1. A curve extracting apparatus comprising:
    input processing means for inputting drawing data;
    display processing means for performing a graphic displaying operation including a drawing displaying operation or a menu displaying operation in accordance with said drawing data;
    interaction processing means for processing interactions between said apparatus and an operator who inputs commands; and
    closed loop extracting means which prompts said operator to specify as an initial edge an edge on a drawing displayed graphically, traces edges connected successively to said initial edge, and when a branch point connected to at least two edges is reached, prompts said operator to specify one of said edges connected to said branch point, and traces the following edges, to extract, as a closed loop, said edges which are traced until said initial edge is reached again.

2. An apparatus as claimed in claim 1 wherein said closed loop extracting means displays said edges traced from said initial edge until said branch point, said at least two edges connected to said branch point and other edges in such a manner as to be distinguished from one another, when prompts said operator to specify one of said at least two edges connected to said branch point.

3. An apparatus as claimed in claim 1 wherein said closed loop extracting means selects as an initial edge an edge at a predetermined position on a drawing displayed graphically instead of prompting said operator to specify an initial edge.

4. An apparatus as claimed in claim 3 further comprising groove central axis configuration extracting means which prompts said operator to specify as an initial edge an edge on a closed loop extracted, wherein said groove central axis configuration extracting means employs as a start point the middle point or the center of said initial edge, determines as a relay point the middle point of a straight line connected between the ends of two edges extended respectively from two ends of said initial edge, and performs an operation repeatedly such that the middle point of a straight line connected between the ends of two edges extended respectively from the ends of the preceding two edges is determined as a relay point, and when a final edge is reached, said groove central axis configuration extracting means determines as an end point the middle point or the center of said final edge, and connects said start point, relay points and end point with edges suitable for said closed loop, to form a groove central axis configuration.

5. An apparatus as claimed in claim 1 further comprising groove central axis configuration extracting means which prompts said operator to specify as an initial edge an edge on a closed loop extracted, wherein said groove central axis configuration extracting means employs as a start point the middle point or the center of said initial edge, determines as a relay point the middle point of a straight line connected between the ends of two edges extended respectively from two ends of said initial edge, and performs an operation repeatedly such that the middle point of a straight line connected between the ends of two edges extended respectively from the ends of the preceding two edges is determined as a relay point, and when a final edge is reached, said groove central axis configuration extracting means determines as an end point the middle point or the center of said final edge, and connects said start point, relay points and end point with edges suitable for said closed loop, to form a groove central axis configuration.

6. A curve extracting apparatus comprising:
input processing means for inputting drawing data;
display processing means for performing a graphic displaying operation including a drawing displaying operation and a menu displaying operation in accordance with said drawing data;
interaction processing means for processing interactions between said apparatus and an operator who inputs commands; and
closed loop extracting means which prompts said operator to specify as an initial edge an edge on a drawing displayed graphically, traces edges connected successively to said initial edge, and when a branch point connected to at least two edges is reached, selects one of said edges connected to said branch point which forms a maximum or minimum angle with the preceding edge thereof, and traces the following edges, to extract, as a closed loop, said edges which are traced until said initial edge is reached again.

7. An apparatus as claimed in claim 6 wherein said closed loop extracting means selects as an initial edge an edge at a predetermined position on a drawing displayed graphically instead of prompting said operator to specify an initial edge.

8. An apparatus as claimed in claim 6 further comprising groove central axis configuration extracting means which prompts said operator to specify as an initial edge an edge on a closed loop extracted, wherein said groove central axis configuration extracting means employs as a start point the middle point or the center of said initial edge, determines as a relay point the middle point of a straight line connected between the ends of two edges extended respectively from two ends of said initial edge, and performs an operation repeatedly such that the middle point of a straight line connected between the ends of two edges extended respectively from the ends of the preceding two edges is determined as a relay point, and when a final edge is reached, said groove central axis configuration extracting means determines as an end point the middle point or the center of said final edge, and connects said start point, relay points and end point with edges suitable for said closed loop, to form a groove central axis configuration.

9. A curve extracting apparatus comprising:
input processing means for inputting drawing data;
display processing means for performing a graphic displaying operation including a drawing displaying operation and a menu displaying operation in accordance with said drawing data;
interaction processing means for processing interactions between said apparatus and an operator who inputs commands; and
hole group extracting means prompts said operator to specify as an initial hole a hole on a drawing displayed graphically and to specify a hole arrangement pattern, and retrieves holes which are equal in diameter to said initial hole, and are on said hole arrangement pattern, and extracts said initial hole and said holes thus retrieved as a hole group.

10. An apparatus as claimed in claim 9 wherein said hole group extracting means computes said hole arrangement pattern with at least two holes on said hole arrangement pattern specified which are other than said initial hole.

11. An apparatus as claimed in claim 10 wherein said hole group extracting means displays said initial hole and said holes thus retrieved in such a manner that said initial hole and said holes thus retrieved are distinguished from other holes, prompts said operator to specify said initial hole and all or part of said holes thus retrieved, and extracts as a hole group said initial hole and some of said holes thus retrieved which are specified by said operator, or the remaining of said holes thus retrieved which are not specified by said operator.

12. An apparatus as claimed in claim 9 wherein said hole group extracting means displays said initial hole and said holes thus retrieved in such a manner that said initial hole and said holes thus retrieved are distinguished from other holes, prompts said operator to specify said initial hole and all or part of said holes thus retrieved, and extracts as a hole group said initial hole and some of said holes thus retrieved which are specified by said operator, or the remaining of said holes thus retrieved which are not specified by said operator.

13. A curve extracting apparatus comprising:
input processing means for inputting drawing data;
display processing means for performing a graphic displaying operation including a drawing displaying operation and a menu displaying operation in accordance with said drawing data;

interaction processing means for processing interactions between said apparatus and an operator who inputs commands; and open loop extracting means which prompts said operator to specify, as an initial edge and a final edge, two edges on a drawing displayed graphically, traces edges connected successively to said initial edge, and when a branch point connected to at least two edges is reached, prompts said operator to specify one of said edges connected to said branch point, and traces the following edges, to extract, as an open loop, said edges which are traced until said final edge is reached.

14. An apparatus as claimed in claim 13 wherein said open loop extracting means displays said edges traced from said initial edge until said branch point, said at least two edges connected to said branch point and other edges in such a manner as to be distinguished from one another, when causing said operator to specify one of said at least two edges connected to said branch point.

15. A curve extracting apparatus comprising:
input processing means for inputting drawing data;
display processing means for performing a graphic displaying operation including a drawing displaying operation and a menu displaying operation in accordance with said drawing data;
interaction processing means for processing interactions between said apparatus and an operator who inputs commands; and
hole group extracting means which prompts said operator to specify as an initial hole a hole on a drawing displayed graphically, and retrieves holes which are equal in diameter to said initial hole, and extracts said initial hole and said holes thus retrieved as a hole group.

16. An apparatus as claimed in claim 15 wherein said hole group extracting means displays said initial hole and said holes thus retrieved in such a manner that said initial hole and said holes thus retrieved are distinguished from other holes, prompts said operator to specify said initial hole and all or part of said holes thus retrieved, and extracts as a hole group said initial hole and some of said holes thus retrieved which are specified by said operator, or the remaining of said holes thus retrieved which are not specified by said operator.

17. An apparatus as claimed in any one of claims 1 to 16 wherein said display processing means displays said edges thus extracted and other edges in such a manner that the former edges and the latter edges are distinguished from each other.

18. An apparatus as claimed in any one of claims 1 through 16 further comprising precision setting and changing means for setting and changing the precision in arithmetic operations for determination of the conditions of connection of edges, for detection of the intersections of edges, and for identification of edges.

19. An apparatus as claimed in any one of claims 1 through 16 further comprising system parameter setting and changing means for setting and changing system parameters for enlargement, contraction, movement, erase and retrieval of part of said drawing displayed.

20. An NC programming system comprising:
CAD means for forming drawing data;
curve extracting means for forming curve data based on the drawing data; and
CAM means for forming NC programs in accordance with the curve data prepared by said curve extracting means,
wherein said curve extracting means comprises:
input processing means for inputting drawing data;
display processing means for performing a graphic displaying operation including a drawing displaying operation or a menu displaying operation in accordance with said drawing data;
interaction processing means for processing interactions between said system and an operator who inputs commands; and
closed loop extracting means which prompts said operator to specify as an initial edge an edge on a drawing displayed graphically, traces edges connected successively to said initial edge, and when a branch point connected to at least two edges is reached, prompts said operator to specify one of said edges connected to said branch point, and traces the following edges, to extract, as a closed loop, said edges which are traced until said initial edge is reached again.

21. An NC programming system comprising:
CAD means for forming drawing data;
curve extracting means for forming curve data based on the drawing data; and
CAM means for forming NC programs in accordance with the curve data prepared by said curve extracting means,
wherein said curve extracting means comprises:
input processing means for inputting drawing data;
display processing means for performing a graphic displaying operation including a drawing displaying operation and a menu displaying operation in accordance with said drawing data;
interaction processing means for processing interactions between said system and an operator who inputs commands; and
closed loop extracting means which prompts said operator to specify as an initial edge an edge on a drawing displayed graphically, traces edges connected successively to said initial edge, and when a branch point connected to at least two edges is reached, selects one of said edges connected to said branch point which forms a maximum or minimum angle with the preceding edge thereof, and traces the following edges, to extract, as a closed loop, said edges which are traced until said initial edge is reached again.

22. An NC programming system comprising:
CAD means for forming drawing data;
curve extracting means for forming curve data based on the drawing data; and
CAM means for forming NC programs in accordance with the curve data prepared by said curve extracting means,
wherein said curve extracting means comprises:
input processing means for inputting drawing data;
display processing means for performing a graphic displaying operation including a drawing displaying operation and a menu displaying operation in accordance with said drawing data;
interaction processing means for processing interactions between said system and an operator who inputs commands; and
open loop extracting means which prompts said operator to specify, as an initial edge and a final edge, two edges on a drawing displayed graphically, traces edges connected successively to said initial edge, adn when a branch point connected to at least two edges is reached, prompts said operator to specify one of said edges connected to said branch point, and traces the following edges, to extract, as an open loop, said edges which are traced until said final edge is reached.

23. An NC programming system comprising:
CAD means for forming drawing data;
curve extracting means for forming curve data based on the drawing data; and
CAM means for forming NC programs in accordance with the curve data prepared by said curve extracting means,
wherein said curve extracting means comprises:
input processing means for inputting drawing data;
display processing means for performing a graphic displaying operation including a drawing displaying operation and a menu displaying operation in accordance with said drawing data;
interaction processing means for processing interactions between said system and an operator who inputs commands; and
hole group extracting means which prompts said operator to specify as an initial hole a hole on a drawing displayed graphically, and retrieves holes which are equal in diameter to said initial hole, and extracts said initial hole and said holes thus retrieved as a hole group.

24. An NC programming system comprising:
CAD means for forming drawing data;
curve extracting means for forming curve data based on the drawing data; and
CAM means for forming NC programs in accordance with the curve data prepared by said curve extracting means,
wherein said curve extracting means comprises:
input processing means for inputting drawing data;
display processing means for performing a graphic displaying operation including a drawing displaying operation and a menu displaying operation in accordance with said drawing data;
interaction processing means for processing interactions between said system and an operator who inputs commands; and
hole group extracting means which prompts said operator to specify as an initial hole on a drawing displayed graphically and to specify a hole arrangement pattern, and retrieves holes which are equal in diameter to said initial hole, and are on said hole arrangement pattern, and extracts said initial hole and said holes thus retrieved as a hole group.

* * * * *